Feb. 21, 1961 A. O. McCOUBREY 2,972,690
ION PUMP AND GAUGE
Filed July 28, 1959
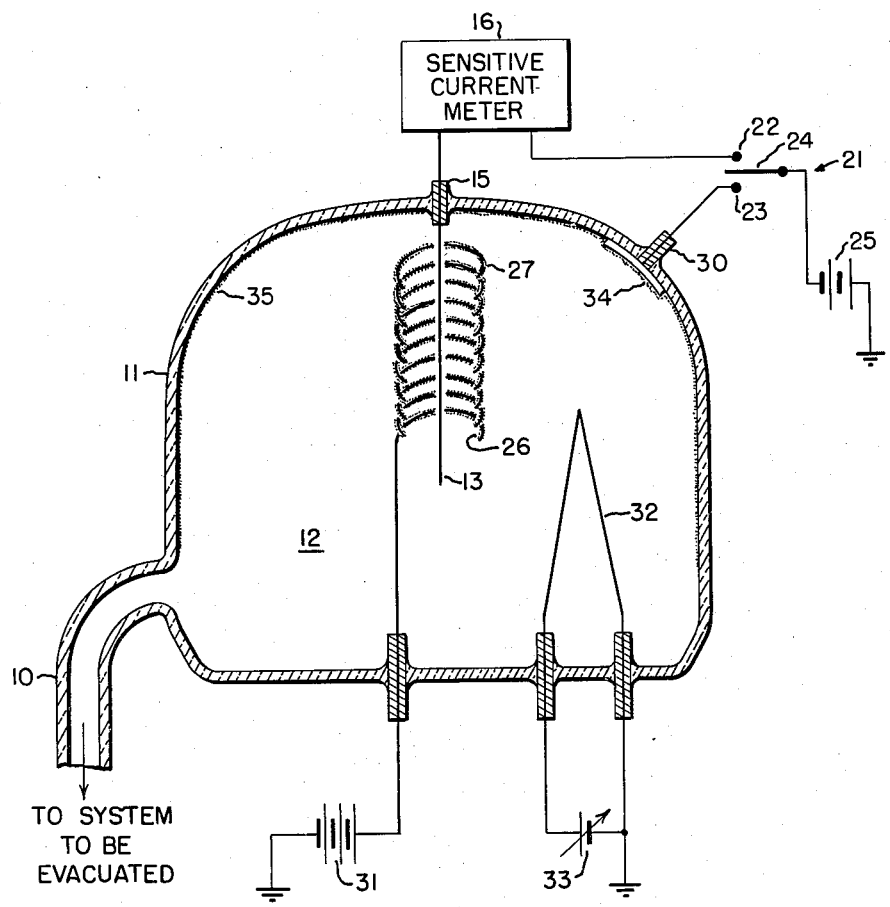
INVENTOR.
ARTHUR O. McCOUBREY
BY Kenway Jenney.
Witter Hildreth
ATTORNEYS

United States Patent Office 2,972,690
Patented Feb. 21, 1961

2,972,690
ION PUMP AND GAUGE
Arthur O. McCoubrey, Topsfield, Mass., assignor to National Company, Inc., Malden, Mass., a corporation of Massachusetts
Filed July 28, 1959, Ser. No. 830,133
5 Claims. (Cl. 313—7)

The present invention relates in general to a combination of a vacuum pump and a vacuum gauge and in particular to a high-vacuum pump in combination with an ionization gauge.

In recent years, extensive research on the properties of materials has pointed up the importance of instruments capable of obtaining extremely low vacuum pressures, as well as instruments having the ability of accurately measuring these pressures. In general, the high vacuum pumps in use today consist of ion pumps of the kind disclosed in Patent No. 2,727,167. Pumps of this kind normally depend on fore-pumping by means by means of oil or mercury diffusion pumps, in order to remove the bulk of the gases in the enclosed space to be evacuated. Thereafter, the system is sealed off and ion pumping is initiated to remove the remaining gas molecules. This is brought about by the introduction of an electron-emissive element into the aforesaid space. The released electrons are accelerated and tend to collide with the free gas molecules to produce ionization. The positively charged ions are attracted to an electrode in the space to be evacuated which communicates with the outside and which has a negative potential applied thereto. The ion current thus produced is withdrawn through the walls of the enclosed space. The rate of gas removal depends on the rate at which ionization takes place which, in turn, depends on the rate of electron emission.

In the past high-vacuum pressure measurements have been commonly carried out with ionization gauges of the type disclosed, for example, at pages 571 and 572 of Review of Scientific Instruments, vol. 21, June 1950. These ionization gauges are similar but not identical in construction to the apparatus described above for ion pumping. By keeping the rate of electron emission constant, the ion current received at the electrode which has a negative potential applied thereto, is a measure of the rate of ionization within the enclosed space and hence, a measure of the existing gas pressure. A high-vacuum ion pump and an ionization gauge have also been combined in the same envelope, such as shown by Patent No. 2,796,555. The latter instrument which, like the systems above comprises an electron acceleration tube, is however, seriously limited by its dependence on heating means in addition to the cathode heating means. Of even greater importance is the fact that the particular construction of the instrument limits the obtainable vacuum to a pressure of about $1 \times 10^{-6}$ mm. of mercury.

It is the object of the present invention to provide a simple and reliable instrument which is capable of obtaining a very high vacuum, for example of the order of $10^{-10}$ mm. Hg and higher which is combined with means for measuring this vacuum. It is another object of my invention to provide a device of the type described which utilizes common ancillary power supplies so that no expensive additional equipment is required when operation as a pump or pressure gauge is desired. These and other objects in the invention together with novel features and advantages thereof will become apparent from the following detailed specification with reference to the accompanying drawing, the single figure of which illustrates a preferred embodiment of the invention in schematic form.

With reference now to the drawing, a glass envelope 11 defines a chamber 12 which is to be evacuated and which is in communication by means of conduit 10, with a system to be evacuated. The instrument basically comprises an acceleration tube having an ion collector 13 which consists of a single wire disposed centrally in the chamber and communicating with the exterior of the chamber through a gas-tight seal 15. The exterior portion of the ion collector is connected to highly sensitive meter for electric current 16. The meter 16 is in turn connected to a terminal 22 of a selective switching circuit generally indicated at 21, whose switching armature 24 is adapted to contact terminals 22 or 23 selectively. A source of negative potential 25 is connected between armature 24 and a reference potential. In a preferred embodiment a potential of approximately $-50$ volts with respect to ground is placed on the switching armature. A spiral grid 26 is disposed within envelope 11 in encircling relationship with respect to ion collector 13. A coating 27 of a getter material is deposited on the grid wire, as illustrated by means of the dotted line following the same. In a preferred embodiment a titanium getter is used. A source 31 of positive voltage is connected to the grid 26 exteriorly of envelope 11 and is adapted to place a positive potential on the grid with respect to a reference potential. In a preferred embodiment, source 31 applies a potential of $+200$ volts to the grid with respect to ground. An electron-emitting cathode 32 is disposed outside the space enclosed by the spiral grid, the grid serving to shield the ion collector 13 from the cathode 32. As illustrated in the drawing, cathode 32 is of the direct heating type. A variable source 33 which is referenced to ground, supplies the heating current. An electrical contact 34 is disposed on the interior surface of envelope 11 and communicates through a gas-tight seal 30, with terminal 23 of the switch 21.

In operation, heating of the electron emitting cathode 32 by means of source 33 releases electrons within the chamber 12; these electrons are drawn to the grid 26 due to the positive potential applied to the latter. Fore-pumping of the system to be evacuated and hence, of chamber 12, normally precedes the use of the instrument as an ion pump. Thereafter, when the instrument is used as a pump, the armature 24 contacts terminal 23 so that a negative potential is placed on contact 34. Electrons striking the gas molecules in chamber 12 cause ionization of the gas. The positively charged ions are attracted to contact 34 due to the negative potential applied to the latter. The ion current thus obtained passes through battery 25 to ground.

Those electrons which are emitted by cathode 32 and which reach grid 26, produce heating of the latter to very high temperatures as a result of electron bombardment. Molecules of the titanium getter material deposited on the grid spiral are released because of the high temperature of the grid and are deposited in a coating 35 on the interior of glass envelope 11. Since the coating of getter material 35 is conductive and covers contact 34, the negative potential of source 25 is applied thereto. Gas molecules are removed from space 12 by the gettering action of the titanium molecules released upon electron bombardment of the grid. In addition, the positively charged ions produced by electron impact with the gas molecules are attracted to coating 35 by the negative potential thereon to remove additional gas molecules from space 12. Accordingly, an improved ion pumping action is obtained which is capable of producing an extremely high vacuum.

When the instrument is to be used as a measuring device, armature 24 is positioned to engage terminal 22; the negative potential applied to contact 34 and coating 35 is removed and applied instead to ion collector 13 through meter 16. A given cathode heating current will produce a predetermined electron flow from cathode 32 to the positively charged grid 26. In the manner outlined above, electron impact with any remaining gas molecules within the enclosure 11 produces ionization, the positively charged ions being attracted by the negative potential on the ion collector. In general the ion current is sufficiently large so that a direct measurement of the current may be made by a highly sensitive meter 16 to indicate the pressure.

It will be evident that numerous modifications may be made without departing from the spirit and scope of the invention herein. Thus, the grid may have any number of configurations as long as it provides suitable fields for accelerating the electrons and ions. The getter material on the grid spiral need not of course consist of titanium, other well-known materials being similarly adapted to serve the same function. It is also possible to wind a spiral of getter material about the wire of grid 26 which, in the latter case, remains bare. Bombardment by electrons emanating from cathode 32 then releases molecules of the getter material from the getter wire encircling the grid rather than from the grid itself.

It will be readily understood that cathode 32 need not be heated directly, an indirectly heated cathode being similarly adapted to the purpose of the present invention. It is highly desirable, however, that source 33 be variable since a much higher electron flow is required for electron bombardment during the pump activation and outgassing than is necessary for measurement and pumping purposes. In general, the ion pump activation operation may be combined with the outgassing operation in order to save one step in the process and simplify ancillary electrical apparatus.

Various modifications are also possible in applying a positive potential to the ion collector and to contact 34 respectively. For example, separate sources of negative potential may be used for these elements, it being desirable only that both elements do not simultaneously attract ions. In the same manner that grid 26 may assume various different configurations, ion collector 13 and cathode 32 respectively, may be changed in form. For example, it may be advantageous to provide a symmetrical cathode arrangement whereby cathode 32 surrounds the ion collector.

With the arrangement described above, a simple and reliable instrument has been provided which permits the evacuation of a chamber to pressures of lower than $1 \times 10^{-10}$ mm. Hg as well as providing a precise measurement of this pressure.

Having thus described the invention, it will be apparent that numerous modifications and departures, as explained above, may now be made by those skilled in the art, all of which fall within the scope contemplated by the invention. Consequently, the invention herein disclosed is to be construed as limited only by the spirit and scope of the appended claims.

Having thus described the invention, I claim:

1. Apparatus for evacuating a system including an enclosed chamber and measuring the pressure therein, comprising in combination a cathode disposed in said chamber and being adapted to emit electrons upon being heated, an ion collector disposed in said chamber spaced from said cathode, said ion collector communicating with the exterior of said chamber through a wall thereof, a spiral grid disposed in encircling relationship to said ion collector, said grid being coated with electrically conducting getter material, and being adapted to release molecules of said getter material upon bombardment with electrons from said cathode, means for applying a positive potential to said grid with respect to said cathode, an electrical contact disposed interiorly of said chamber wall without encirclement by said grid and communicating with the exterior through said wall, and means for applying a negative potential with respect to said cathode selectively to said ion collector and to said contact.

2. In an electron acceleration tube defined by a gas-tight envelope, a cathode, an ion collector, a grid interposed between said cathode and said ion collector, means associated with said grid to release molecules of a getter material, means disposed interiorly of said envelope out of line with said cathode and collector and adapted to contact said getter molecules, means for applying a positive potential to said grid with respect to said cathode, and means for applying a negative potential with respect to said cathode selectively to said contact means and to said ion collector.

3. Apparatus for evacuating a system and measuring the pressure therein comprising a chamber communicating with said system, said chamber being defined by a glass envelope, a single-wire ion collector disposed centrally of said envelope, said ion collector communicating electrically with the exterior of said envelope, a cathode spaced from said wire, means for directly heating said cathode to emit electrons therefrom, means for maintaining said cathode at a reference potential, a helical wire grid disposed intermediate said cathode and said ion collector in encircling relationship to the latter, said grid being coated with a titanium getter material adapted to release getter molecules upon bombardment with said electrons, means for applying a potential to said grid which is positive with respect to said reference potential, an electrical contact disposed on the interior surface of said glass envelope opposite said grid, said contact communicating with the exterior of said envelope, means for applying a negative potential with respect to said reference potential to said ion collector and said contact selectively, to cause one of said last-recited elements to attract ions released within said envelope, and measuring means connected to said ion collector exteriorly of said envelope.

4. Apparatus for pumping ions from an envelope and for measuring the pressure therein, comprising an ion collector communicating with the exterior of said envelope, a cathode spaced from said ion collector and being adapted to emit electrons, a grid disposed intermediate said cathode and said ion collector, means for applying a positive potential to said grid with reference to said cathode, said ion pumping apparatus including coating means associated with said grid to release molecules of a getter material, means communicating with the exterior of said envelope to contact said getter molecules said contact means being disposed out of line with said cathode and grid, means for applying a negative potential to said contact means, said ionization measuring apparatus including means for applying alternatively a negative potential to said ion collector, and means exterior to said envelope connected to said ion collector means to measure the current collected by the latter.

5. An electron acceleration tube comprising a plurality of elements disposed within an envelope, said elements including a first electrode adapted to release electrons, means maintaining said first electrode at a reference potential, a second electrode, a third electrode interposed between said first and second electrodes, means for applying a potential to said third electrode adapted to attract said electrons, coating means associated with said third electrode adapted to release molecules of a getter material, an electrical contact attached to the interior surface of said envelope and adapted to contact said released getter materials and means for selectively applying a potential to said second electrode and to said contact means, said potential being negative with respect to the potential of said first electrode.

References Cited in the file of this patent

UNITED STATES PATENTS

| | | |
|---|---|---|
| 2,454,564 | Nelson | Nov. 23, 1948 |
| 2,582,647 | Morgan | Jan. 15, 1952 |
| 2,605,431 | Bayard | July 29, 1952 |
| 2,625,586 | Lander | Jan. 13, 1953 |
| 2,829,337 | Groendijk | Apr. 1, 1958 |